UNITED STATES PATENT OFFICE.

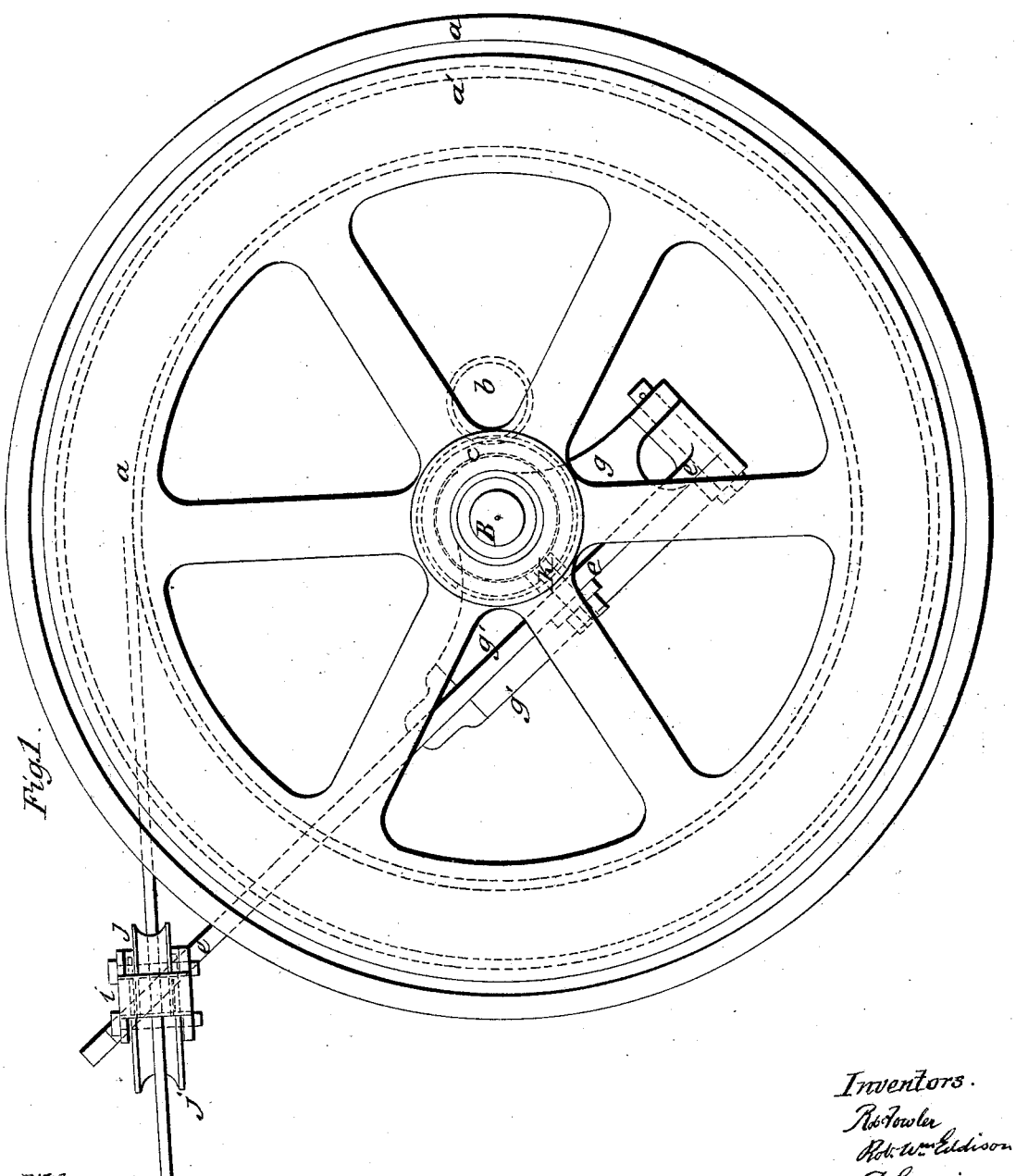

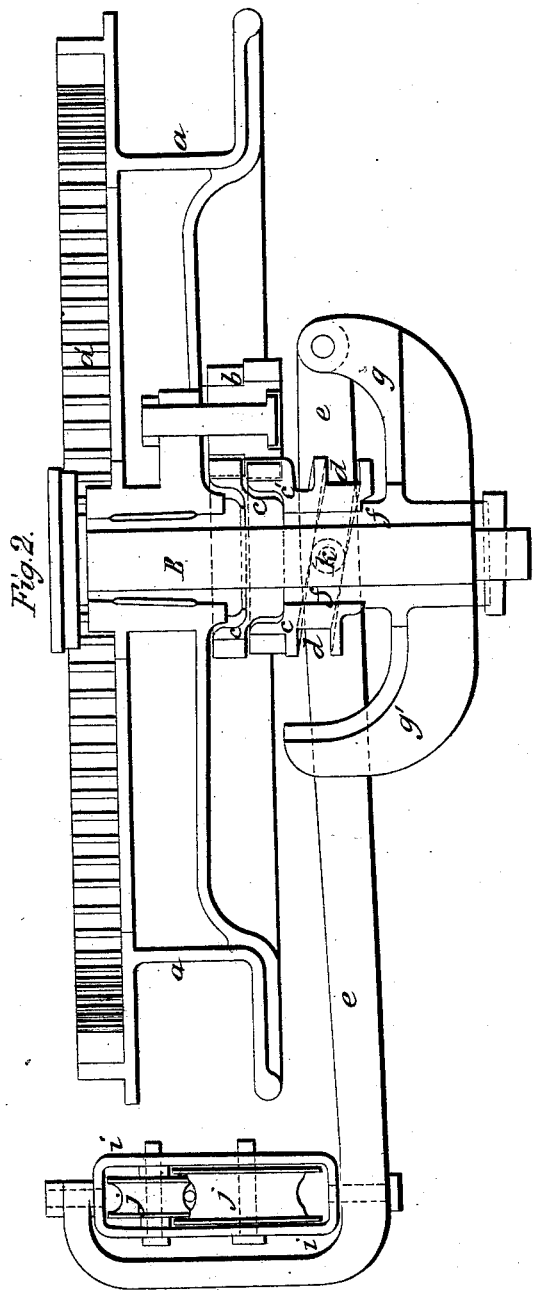

ROBERT FOWLER, OF LONDON, AND ROBERT WILLIAM EDDISON, EXECUTORS OF JOHN FOWLER, JR., AND DAVID GREIG AND RICHARD NODDINGS, OF LEEDS, COUNTY OF YORK, ENGLAND, ASSIGNORS TO WILLIAM P. TATHAM, OF PHILADELPHIA, PENNSYLVANIA.

IMPROVEMENT IN STEAM-PLOWS.

Specification forming part of Letters Patent No. 57,653, dated August 28, 1866.

*To all whom it may concern:*

Be it known that we, ROBERT FOWLER, of London, and ROBERT WILLIAM EDDISON, executors of JOHN FOWLER, Jr., and DAVID GREIG and RICHARD NODDINGS, of Leeds, in the county of York, England, (that is to say, the said JOHN FOWLER, Jr., in his life-time, jointly with the said DAVID GREIG and RICHARD NODDINGS,) have invented certain new and useful Improvements in Machinery for Operating Agricultural Implements by Steam; and we do hereby declare that the following is a full, clear, and exact description thereof, reference being had to the accompanying drawings, making part of this specification, in which—

Figure 1 is a plan, and Fig. 2, a vertical section of our said improved machinery.

The same letters indicate like parts in both figures.

Our said improvements, which relate to machinery for hauling or drawing agricultural implements across fields by winding a rope upon a drum driven by steam-power, consists in giving a vibratory motion to the end of a guiding-lever by differential wheels operated by the rotation of the drum, so that the rope shall be regularly and properly laid on the face of the drum and between its flanges, and also in so mounting the guiding-lever that it shall be free to take any position in the circle around the drum to suit the hauling or drawing angle.

In the accompanying drawings, $a$ represents the drum on which the hauling-rope is wound. It turns on a fixed hanging stud, B, of the frame of the engine, and it is provided with cogs on its periphery, as at $a'$, so that it can be driven by a pinion on the crank-shaft of the engine; but as the engine and the mode of driving a drum for this purpose are well known, it is deemed unnecessary to represent them.

A double pinion, $b$, is mounted to turn freely on a stud projecting from one of the arms of the drum $a$. The upper half of this pinion engages the cogs of a wheel, $c$, keyed firmly to the fixed stud B, so that it shall not turn, and the lower half of the said double pinion $b$ engages the cogs of another wheel, $c'$, mounted to turn on a sleeve which turns on the lower part of the stud B below the fixed wheel $c$, which sleeve will be seen at $f$, and the hub of the wheel $c'$ is formed with a cam-groove, $d$. If the double pinion $b$ has, say ten cogs, the wheel $c$ should have twenty-one, and the wheel $c'$, which carries the cam-groove, twenty. The sleeve $f$, which turns freely on the stud B, is formed with suitable arms $g$ and $g'$. A lever, $e$, is mounted with one end turning on a fulcrum-pin in the arms $g$, and it plays up and down between the other arms $g'$, and as both sets of arms form part of the sleeve or hub $f$, which turns freely on the stud B, the lever can revolve on the same axis of the drum $a$.

The outer end of the said lever $e$ extends beyond the periphery of the drum $a$, and is there formed to receive the vertical journals of a frame, $i$, in which are mounted the rollers $j$, for guiding to the periphery of the drum the rope by which agricultural implements are to be hauled or drawn, and this lever $e$ is provided with a roller or pin, $k$, (represented by dotted lines,) which runs in the cam-groove $d$, so formed and inclined to the axis of rotation that in one revolution it will vibrate the outer end of the lever $e$ up and down to the extent of the width of the face of the drum $a$ between its two flanges, and as the fixed wheel $c$ has one more cog than the wheel $c'$, and the double pinion $b$ receives motion from the fixed wheel $c$ and imparts motion to $c'$, it follows that the wheel $c'$, with its cam-groove $d$, will be turned at each revolution of the drum $a$ the distance of one cog, thereby elevating or depressing the outer end of the lever $e$. In this way, by giving the required proportions, the rope will be properly guided and laid on the winding-drum, while at the same time the guiding end of the lever can take any desired position relatively to the drum to suit the angle at which the implement is being hauled. The proportions given have been found to answer a good purpose; and although we have found the construction and arrangement of parts herein given to answer a good purpose, we do not wish to be understood as limiting our claim of invention thereto, as these may be variously changed or modified within the range of our said invention.

What we claim as our invention, and desire to secure by Letters Patent, is—

1. In guiding the laying of the rope onto the periphery of the drum, in machinery for drawing agricultural implements by steam-power, combining the guiding-lever for guiding the rope with the flanged drum for drawing and winding the rope by means of the cam and differential wheels, substantially as described, and for the purpose specified.

2. Connecting the guiding-lever with the winding-drum, so that, in addition to having an up-and-down motion, to lay the rope properly on the face of the drum, its guiding end shall be free to revolve around the drum, and thus adapt itself to the angle at which the rope may be hauling, substantially as described.

ROBERT FOWLER.
ROBT. WM. EDDISON.
D. GREIG.
R. NODDINGS.

Witnesses as to signature of Robert Fowler and Robert William Eddison:
J. RAWLINSON FORD,
JAMES GOUGH,
Clerks to Payne, Eddison, & Ford,
Solicitors, Leeds, England.

Witnesses as to signature of David Greig and Richard Noddings:
ROBT. WM. EDDISON,
JAMES MOSBY.